Aug. 18, 1925.
G. H. McMILLIN
1,549,887
EMERGENCY FOOT BRAKE LEVER FOR AUTOMOBILES
Filed Sept. 9, 1924
Fig. 1.
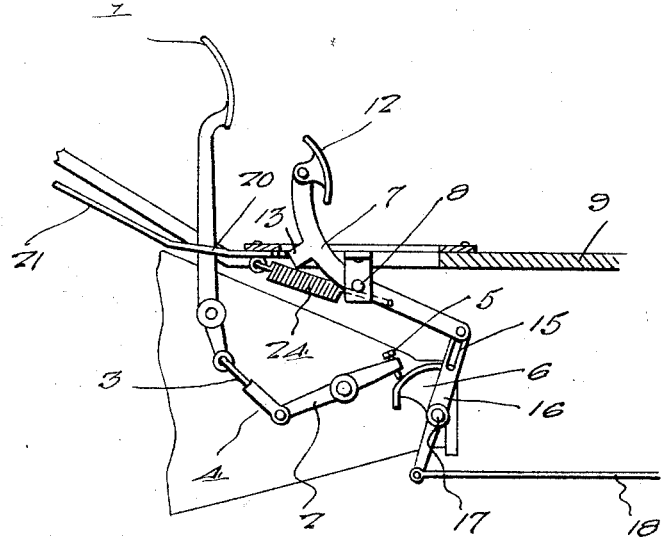
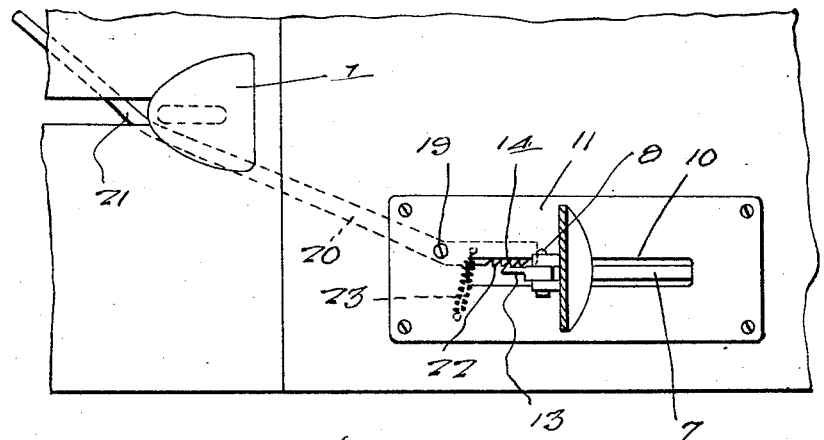
Fig. 2.
Inventor
G. H. McMillin.
By Clarence A. O'Brien.
Attorney Patented Aug. 18, 1925.

1,549,887

UNITED STATES PATENT OFFICE.

GAIL H. McMILLIN, OF LAGRANGE, GEORGIA, ASSIGNOR OF THIRTY-ONE PER CENT TO J. E. DUNSON & BROS. CO., OF LAGRANGE, GEORGIA, AND FORTY-NINE ONE-HUN-DREDTHS PER CENT TO J. F. RACE, J. R. BAILEY, R. H. GANN, W. H. SMAW, AND JNO. T. THOMPSON.

EMERGENCY FOOT-BRAKE LEVER FOR AUTOMOBILES.

Application filed September 9, 1924. Serial No. 736,755.

*To all whom it may concern:*

Be it known that I, GAIL H. MCMILLIN, a citizen of the United States, residing at Lagrange, in the county of Troup and State of Georgia, have invented certain new and useful Improvements in Emergency Foot-Brake Levers for Automobiles, of which the following is a specification.

This invention relates to improvements in emergency brake levers for automobiles, and is more particularly adapted to a foot actuated emergency brake lever, which is employed instead of the usual hand operated emergency brake lever now universally in use.

One of the important objects of the present invention is to provide a means for automatically releasing the emergency foot brake lever when the clutch pedal is depressed.

It has often been experienced that an attempt is made to start the automobile in operation with the emergency brake lever in an operative position, and this often results in serious injury as well as the expenditure for necessary repairs.

The present invention therefore contemplates the provision of an emergency brake lever wherein means is associated therewith which is operable by the clutch lever when the same is depressed for automatically releasing the emergency brake lever, thereby preventing any possibility of an automobile operating with the emergency brake lever, in an operative position.

A still further object of the invention is to provide an emergency brake lever of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the several views:

Figure 1 is a side elevation of the emergency foot brake lever embodying my invention, and Figure 2 is a top plan view thereof, with parts shown in section.

In the drawing, wherein for the purpose of illustration is shown the preferred embodiment of my invention, the numeral 1 designates the usual clutch lever of an automobile, preferably of the Ford type. The same is connected at its lower end to the rocker arm 2 at its forward end through the medium of the slow speed connection 3 and the slow speed clevis 3, the construction of which is well known in the art. The rear end of the rocker arm 2 carries thereon the clutch lever screw 5, which is adapted for engagement with the speed lever 6, the latter being mounted on the usual controller shaft, in the manner well known in the art.

The emergency foot brake lever embodying the present invention is designated at 7, and the same is pivotally supported intermediate its ends as at 8. The upper portion of the foot lever 7 is adapted to extend through a suitable opening, provided in the floor board 9, and the slot 10 provided in the plate 11, which is secured on the upper surface of the floor board directly over the opening provided in the floor board. A treadle 12 is secured on the upper end of the foot lever 7. The upper portion of the emergency foot brake lever 7 is provided with a lateral extension 13, on the outer end of which is formed the pawl 14, the purpose of which will hereinafter be more fully described.

The lower end of the foot lever 7 is connected to the upper slotted portion 13 of the link 16 which is pivotally supported intermediate its ends on the shaft 17, and the lower end of the link is connected to the brake rod 18 in the usual manner. The emergency foot brake lever is positioned at a point rearwardly of the clutch lever 1, and preferably at the same place where the usual hand brake emergency lever would be positioned.

Pivotally supported adjacent the rear end of the under side of the plate 11, on one side of the slot 10, as at 19, is the rod 20. A forward portion of the rod 20 is bent, so as to be disposed within the path of the forward movement of the clutch lever 1, as is illustrated at 21. The rods 15 and 22 are provided on the longitudinal edge of the rear portion of the lever adjacent the slot 10 for cooperation with the pawl 14 formed on the outer end of the lateral extension 13, and a coil spring 23 normally holds the rear portion of the rod 20, in such a position as to cause the pawl 14 to be in engagement with the ratchet teeth 22. For the purpose of normally holding the emergency foot brake lever 7 in an inoperative position, I provide the coil spring 24. One end thereof is secured to the under side of the forward portion of the plate 11, while the other end is secured to the lever 7 adjacent the lower end thereof.

When the parts are arranged as shown in the drawing, the pawl 14 is in engagement with the ratchet teeth 22, whereby the emergency brake lever is held in an operative position and the emergency brakes are applied. The emergency brakes are applied by depressing on the pedal 12 of the emergency foot lever 7, and the pawl 14 will engage the ratchet teeth 22. The emergency foot brake lever is released automatically when the clutch lever 1 is depressed, and when the clutch lever is depressed, the same will engage the forward end 21 of the rod 20, causing the same to swing on its pivot 19, and moving the ratchet teeth 14 out of engagement with the pawl against the tension of the coil spring 23. The coil spring 24 will then return the emergency foot brake lever 7 to its normal position, thereby releasing the emergency brakes and permitting the automobile to operate without any danger of the emergency brakes being applied.

The provision of an emergency foot brake lever of the above mentioned character for use principally upon automobiles of the Ford type will not only prevent an automobile from being started with the emergency brakes applied, but will also be easily operated whenever it is desired to apply the emergency brakes. Furthermore, the emergency brake lever will not, in any way, interfere with the operation of the usual foot levers provided on an automobile of the Ford type. The simplicity with which the present device is constructed, enables the same to be readily and easily attached to the Ford automobiles now in use, without necessitating the alteration of any of the parts thereof to any material extent.

While I have shown the preferred embodiment of my invention, it is to be understood that various changes in the size, shape, and arrangement of parts may be resorted to, without departing from the spirit of the invention and the scope of the appended claims.

Having thus described my invention, what I claim is:

1. In combination with the clutch lever of an automobile, an emergency foot brake lever, an elongated rod pivotally supported adjacent its rear end on the under side of the floor board of the automobile, the forward end of the rod being disposed within the path of the forward movement of the clutch lever, means associated with the rear end of the rod, and said emergency brake lever for holding the latter in an operative position, said rod being adapted to swing on its pivot to release the emergency foot brake lever when the clutch lever is depressed and engages the forward end of the rod.

2. In combination with the clutch lever of an automobile, an emergency foot brake lever, an elongated rod pivotally supported adjacent its rear end on the under side of the floor board of the automobile, the forward end of the rod being disposed within the path of the forward movement of the clutch lever, means associated with the rear end of the rod, and said emergency brake lever for holding the latter in an operative position, said rod being adapted to swing on its pivot to release the emergency foot brake lever when the clutch lever is depressed and engages the forward end of the rod, and means for returning the emergency foot brake lever to its normal inoperative position.

3. In combination with the clutch lever of an automobile, an emergency foot brake lever, a pawl on said foot brake lever, an elongated rod pivotally supported adjacent its rear end on the under side of the floor board of the automobile, ratchet teeth formed on one of the longitudinal edges of the rear portion of the rod for engagement with the pawl to hold the emergency foot brake lever in an operative position, the forward end of the rod being disposed within the path of the forward movement of the clutch lever and the ratchet teeth will be brought out of engagement with the pawl when the clutch lever is depressed.

4. In combination with the clutch lever of an automobile, an emergency foot brake lever, a pawl on said foot brake lever, an elongated rod pivotally supported adjacent its rear end on the under side of the floor board of the automobile, ratchet teeth formed on one of the longitudinal edges of the rear portion of the rod for engagement with the pawl to hold the emergency foot brake lever in an operative position, the forward end of the rod being disposed within the path of the forward movement of the clutch lever and the ratchet teeth will be brought out of engagement with the pawl when the clutch lever is depressed, and means for returning the emergency foot brake pedal to its normal inoperative position.

In testimony whereof I affix my signature.

GAIL H. McMILLIN.